(12) United States Patent (10) Patent No.: US 9,515,856 B2
Kaviani et al. (45) Date of Patent: Dec. 6, 2016

(54) OFFSET AND DECISION FEEDBACK EQUALIZATION CALIBRATION

(71) Applicant: Rambus Inc., Sunnyvale, CA (US)

(72) Inventors: Kambiz Kaviani, Palo Alto, CA (US); Amir Amirkhany, Sunnyvale, CA (US); Jason Chia-Jen Wei, San Jose, CA (US); Aliazam Abbasfar, San Diego, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/720,518

(22) Filed: May 22, 2015

(65) Prior Publication Data

US 2015/0333938 A1 Nov. 19, 2015

Related U.S. Application Data

(63) Continuation of application No. 14/342,367, filed as application No. PCT/US2012/050407 on Aug. 10, 2012, now Pat. No. 9,071,481.

(60) Provisional application No. 61/533,580, filed on Sep. 12, 2011, provisional application No. 61/587,581, filed on Jan. 17, 2012.

(51) Int. Cl.
*H04L 25/03* (2006.01)
*H04B 1/12* (2006.01)

(52) U.S. Cl.
CPC ......... *H04L 25/03057* (2013.01); *H04B 1/123* (2013.01); *H04L 25/03063* (2013.01); *H04L 25/03885* (2013.01)

(58) Field of Classification Search
CPC ..... H04B 1/10; H04B 1/123; H04L 25/03006; H04L 25/03019; H04L 25/03057; H04L 25/03063; H04L 25/03878; H04L 25/03885; H04L 25/03891; H04L 25/03949; H04L 2025/03433; H04L 2025/03439; H04L 2025/03535; H04L 2025/03592
USPC .............. 375/232, 233, 236, 346, 348, 350; 708/322, 323
See application file for complete search history.

(56) References Cited

U.S. PATENT DOCUMENTS

| | | | |
|---|---|---|---|
| 7,715,471 B2 | 5/2010 | Werner et al. | |
| 2004/0158420 A1* | 8/2004 | Kim | H03L 7/0814 702/66 |
| 2004/0203559 A1 | 10/2004 | Stojanovic et al. | |

(Continued)

OTHER PUBLICATIONS

PCT International Preliminary Report on Patentability dated Mar. 20, 2014 in International Application No. PCT/US2012/050407. 8 pages.

(Continued)

*Primary Examiner* — Young T Tse
(74) *Attorney, Agent, or Firm* — Fenwick & West LLP

(57) ABSTRACT

A decision feedback equalizer is calibrated to compensate for estimated inter-symbol interference in a received signal and offsets of sampling devices. The decision feedback equalizer is configured so that an output signal of a sampling circuit represents a comparison between an input signal and a reference of the sampling circuit under calibration. An input signal is received over a communication channel that includes a predetermined pattern. The predetermined pattern is compared to the output signal to determine an adjusted reference for configuring the sampling circuit that accounts for both offset and inter-symbol interference effects.

19 Claims, 13 Drawing Sheets

(56) References Cited

U.S. PATENT DOCUMENTS

| | | | |
|---|---|---|---|
| 2005/0041979 A1* | 2/2005 | Gu | H04B 10/2507 |
| | | | 398/155 |
| 2006/0188043 A1 | 8/2006 | Zerbe et al. | |
| 2006/0291552 A1 | 12/2006 | Yeung et al. | |
| 2008/0304557 A1 | 12/2008 | Hollis | |
| 2009/0285272 A1 | 11/2009 | Stojanovic et al. | |
| 2010/0020861 A1 | 1/2010 | Leibowitz et al. | |
| 2010/0117706 A1 | 5/2010 | Stojanovic et al. | |
| 2010/0135378 A1* | 6/2010 | Lin | H04L 7/0025 |
| | | | 375/233 |
| 2010/0142610 A1 | 6/2010 | Stojanovic et al. | |
| 2011/0096825 A1 | 4/2011 | Hollis | |
| 2011/0249774 A1* | 10/2011 | Thakkar | H04L 25/03057 |
| | | | 375/316 |
| 2012/0155530 A1* | 6/2012 | Zhong | H04L 25/03057 |
| | | | 375/233 |
| 2012/0314756 A1 | 12/2012 | Leibowitz et al. | |
| 2013/0028313 A1 | 1/2013 | Shen et al. | |
| 2013/0241622 A1* | 9/2013 | Zerbe | G11C 7/02 |
| | | | 327/323 |

OTHER PUBLICATIONS

PCT International Search Report and Written Opinion dated Jan. 24, 2013 re International Application No. PCT/US2012/050407. 14 pages.

\* cited by examiner

OFFSET AND DECISION FEEDBACK EQUALIZATION CALIBRATION

RELATED APPLICATIONS

This application is a continuation of U.S. application Ser. No. 14/342,367 filed Feb. 28, 2014, now U.S. Pat. No. 9,071,481, which is a U.S. National Phase Application under 35 U.S.C. 371 of PCT Application No. PCT/US2012/050407 filed Aug. 10, 2012, which claims the benefit of U.S. Provisional Application No. 61/533,580, filed Sep. 12, 2011, and U.S. Provisional Application No. 61/587,581, filed Jan. 17, 2012, the content of which are incorporated by reference herein in their entirety.

BACKGROUND

The present disclosure relates to calibrating an equalizer in a front-end receiver.

Equalizers are commonly used in receiving devices to compensate for signal distortion incurred when a signal is transmitted across a communication channel. One common source of distortion is inter-symbol interference, where the value of a currently received symbol is distorted based on the value of previously or subsequently transmitted symbols. A decision feedback equalizer is a particular type of equalizer designed to compensate for distortion from inter-symbol interference arising from previously transmitted symbols. The decision feedback equalizer estimates this distortion in a received input signal and adjusts either the signal itself or sampling threshold of the signal, based on the previously received symbols. In this way, the decision feedback equalizer seeks to cancel out the inter-symbol interference effect and recover the transmitted signal. For best performance, a decision feedback equalizer should be properly calibrated. Calibration ensures that the equalization parameters are accurately tuned based on the actual characteristics of the channel and the receiver hardware.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

Figure 1:
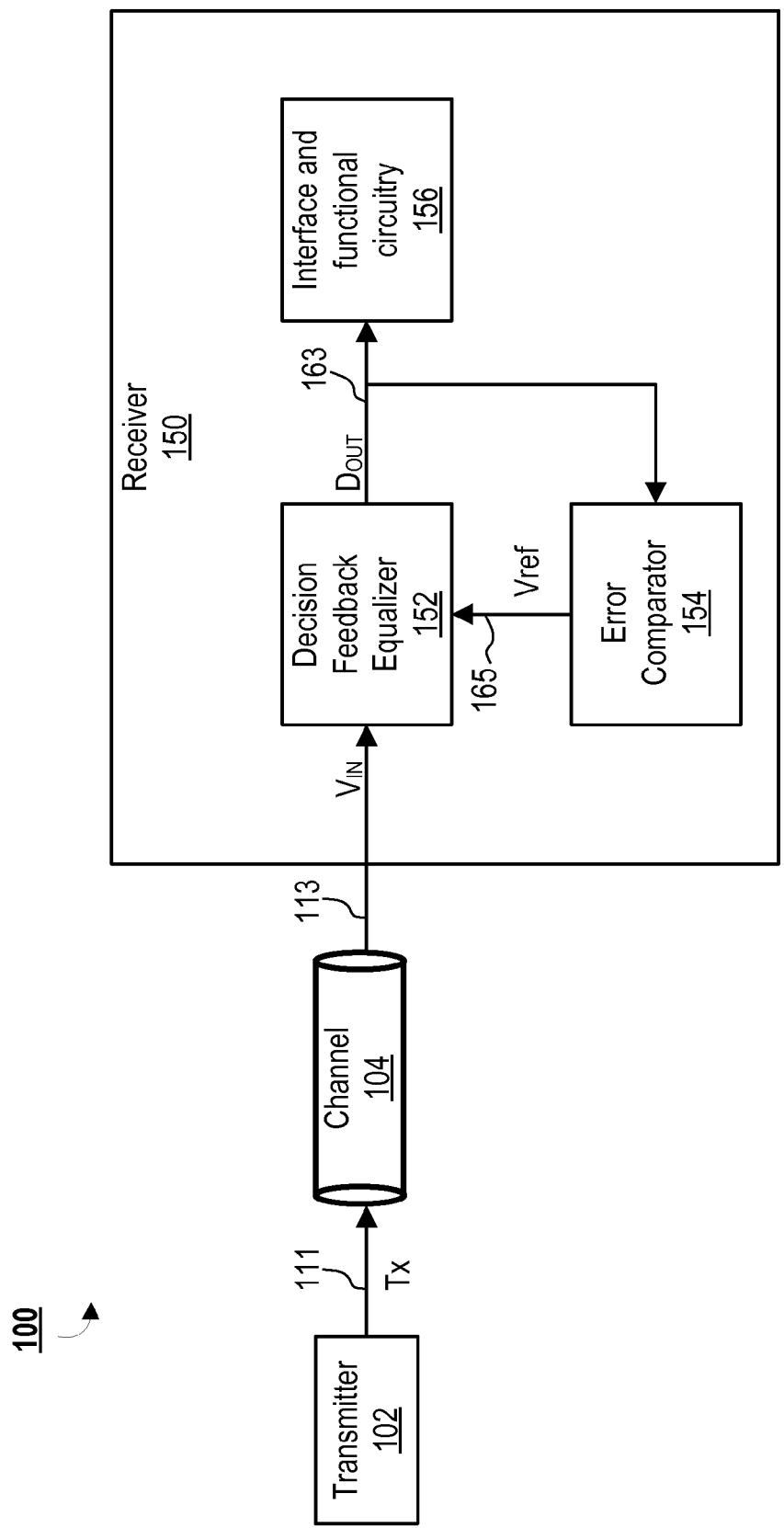
FIG. 1 illustrates a communication system including a decision feedback equalizer with calibration mechanism according to one embodiment.

A calibration method calibrates a decision feedback equalizer to accurately sample an input signal while compensating for estimated inter-symbol interference and offsets of comparators. During the calibration process, the decision feedback equalizer is configured so that an output signal of a sampling circuit represents a comparison between an input signal and a reference of the comparator under calibration. An input signal is received over a communication channel that includes a predetermined pattern. The predetermined pattern is compared to the output signal to determine an adjusted reference for configuring the comparator that accounts for both offset and inter-symbol interference effects. The calibration process may repeat to individually calibrate each reference of the equalizer.

Various embodiments isolate a specific reference under calibration using the predetermined pattern or a calibration structure in a receiver. In a decision feedback equalizer that feeds back one or more historical data bits to equalize a subsequent signal, the pattern can be selected such that each historical data bit in question is necessarily interpreted as a specific value; for example, in a hypothetical decision feedback equalizer that uses a bit "three unit intervals old" (i.e., three bits previous) to equalize a current symbol, the pattern can be a repeating pattern (i.e., sent in multiple iterations) having a specific unit interval that is always a "one" (so as to cause the decision feedback equalizer to always apply a normative amount of feedback in equalization) and then, a subsequent unit interval "three intervals later" can be varied through the multiple iterations amongst multiple different values, with the receiver testing or comparing these values. In this manner, the receiver and system in question can "digitally" adjust the reference until a bit error rate associated with the subsequent unit interval is 50% likely to represent type 1 or type 2 error, representing the proper setting of the reference. In a partial-response decision feedback equalizer, one "phase of data" can be set to a predetermined value during calibration, such that a specific sampler or comparator for an ensuing phase of data is necessarily isolated, permitting similar techniques to be used for calibration. Note that a number of techniques for this isolation are disclosed, e.g., hardware in the receiver can be used to force a predetermined "feedback value" for purposes of comparison, and different techniques can be used for applying a pattern to perform calibration in a receiver lacking such calibration hardware.

Reference will now be made to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

System Architecture

FIG. 1 is a high level block diagram illustrating a communication system 100. A transmitter 102 outputs a transmit signal 111 to a communication channel 104. A receiver 150 receives a receive signal 113 communicated across channel 104 that is representative of transmit signal 111, but may differ due to distortion incurred by the transmission across communication channel 104. In various embodiments, communication channel 104 may comprise, for example, an electrical communication channel, an optical communication channel, or a wireless communication channel. Signals transmitted and received over the channel 104 by the transmitter 102 and receiver 150 respectively may comprise either single ended or differential signals. Furthermore, in various embodiment, transmitter 102 and receiver 150 may be implemented using hardware, firmware, and/or software configured for communication across the different types of channels. Note that for purposes of discussion of FIG. 1, it should be assumed that one specific implementation features the transmitter 102 and receiver 150 as embodied in separate integrated circuit devices (i.e., separate dies) and that the channel 104 comprises a conductive path, such as a printed circuit board trace that conveys signaling at gigahertz rates. In one particular contemplated embodiment, one of the transmitter 102 and receiver 150 is a memory controller, and the other of the transmitter 102 and receiver 150 is a DRAM or other memory device.

In one embodiment, receiver 150 comprises a decision feedback equalizer 152, an error comparator 154, and other interface circuitry and functional circuits 156. In alternative embodiments, receiver 150 may include different or additional components. Decision feedback equalizer 152 receives signal 113 from communication channel 104 and produces one or more digital outputs 163 based on one or more reference signals 165. In one embodiment, decision feedback equalizer 152 samples signal 113 at various sampling instants corresponding to different phases of the input signal 113. At each sampling instant, decision feedback equalizer 152 compares signal 113 to one or more of the reference signals 165 to determine whether signal 113 corresponds to a logic high bit or logic low bit at the sampling instant.

For example, decision feedback equalizer 152 may treat the input 113 as being a double data rate signal having two phases (e.g., even and odd). In this case, the first and second sampling instants may correspond to alternating edges of a clock signal, and decision feedback equalizer 152 produces two output bit streams (e.g., an even output bit stream and an odd output bit stream) corresponding to the samples from the first phase and second phase respectively. Alternatively, the first and second sampling instants may correspond to rising edges and falling edges respectively of a clock signal. In another embodiment, the decision feedback equalizer 152 may treat the input signal 152 as having more than two phases (e.g., 3 phases, 4 phases, etc.) and produce multiple output bit streams 163 each corresponding to samples from one of the multiple phases.

Error comparator 154 monitors output signal(s) 163 and calibrates reference signal(s) 165 used by decision feedback equalizer 152 to generate the samples. In a calibration mode of receiver 150, error comparator 154 performs a calibration process to predict the channel response of communication channel 104 and offset characteristics of decision feedback equalizer 152. Error comparator 154 then sets reference signal(s) 165 to appropriate level(s) to allow receiver 150 to accurately recover transmitted signal 111 from received signal 113.

In one embodiment, error comparator 154 can calibrate a decision feedback equalizer 152 that does not necessarily have dedicated calibration hardware, i.e., hardware that is used only during a calibration stage and not during regular operation. Instead, error comparator 154 manipulates reference signal(s) 165 in a manner that allows it to individually select different portions of decision feedback equalizer 152 for calibration. Then, by using knowledge of known bit patterns sent to receiver 150 during the calibration stage, error comparator 154 can monitor the output signal(s) 163 to determine inter-symbol interference effects and internal offset characteristics of the portion of decision feedback equalizer 152 selected for calibration. Error comparator 154 then sets reference signal(s) 165 so that they compensate for both inter-symbol interference effects and internal offsets of the decision feedback equalizer 152.

In one embodiment, error comparator 154 is embodied in an integrated circuit device that may be part of a memory controller or a memory device. Alternatively, error comparator 154 may comprise one or more processing devices and a computer-readable storage medium storing instructions executable by the one or more processing devices. In other embodiments, error comparator 154 can be implemented using digital logic, firmware, or a combination of hardware, firmware, and/or software.

Other interface circuitry and functional circuits 156 receive output signal(s) 163 and further process or respond to the equalized data. These circuits 156 may include any number of conventional elements found in a receiver 150. For example, these circuits 156 may include an encoding and/or decoding module, a time-aligner, a serializer-deserializer, a signal processor, command processing circuitry, a memory core, etc. Various aspects of this circuitry 156 may be implemented using one or more of digital logic, firmware, or software executing on one more processors.

Figure 2:
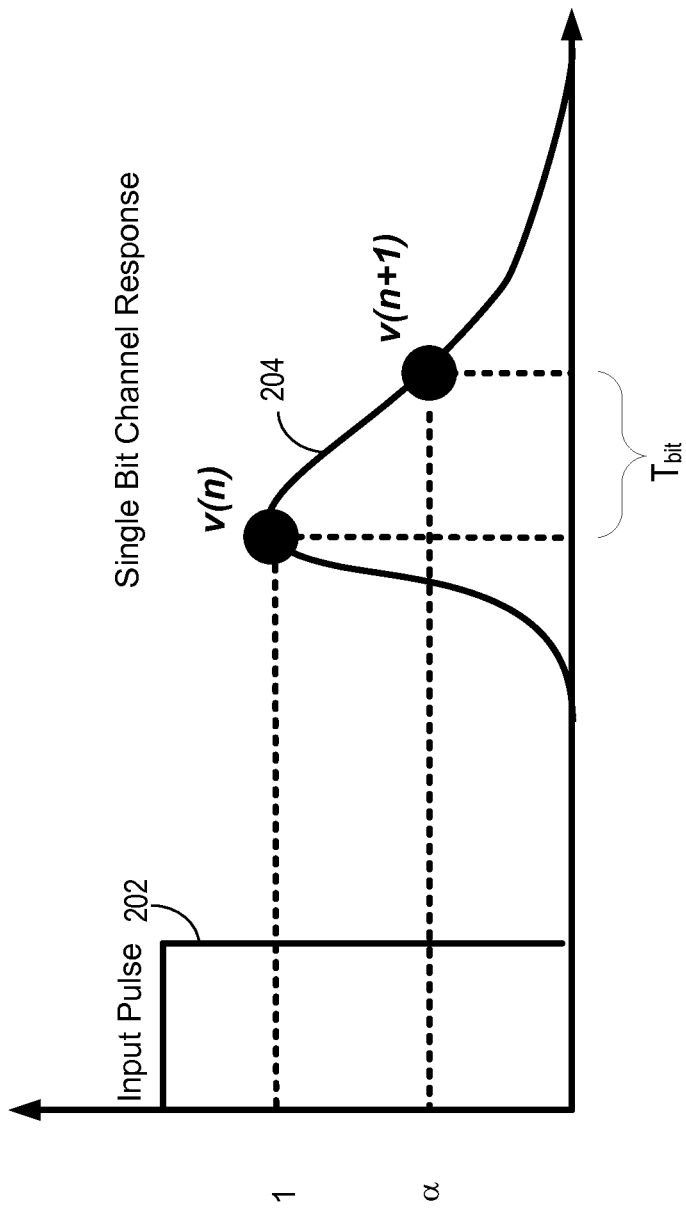
FIG. 2 illustrates a channel response of a communication channel showing inter-symbol interference effects.

FIG. 2 illustrates a channel response 204 of an example communication channel showing the inter-symbol interference effect discussed above. The channel response 204 represents the received signal seen by a receiver in response to a pulse signal 202 (i.e., a single logic high bit) transmitted over communication channel. At time n when a signal corresponding to logic high nth bit is received following transmission, a voltage v(n) appears corresponding to a logic high voltage level. At a time n+1 when the next bit (logic low) is transmitted, a non-zero voltage $v(n+1)=\alpha$ is still present at the receiver from the logic high nth bit. This interference from the nth bit will cause the voltage level of the (n+1)th to be raised by a above the transmitted value (logic low in this example). A decision feedback equalizer will seek to cancel out this distortion by estimating the channel response 204 and compensating for the level of distortion based on knowledge of the previously received bit. Note that the "pulse spreading" effects depicted by FIG. 2 is a common side-effect of using a conductive signal path.

Decision Feedback Equalizer Architecture

Figure 3:
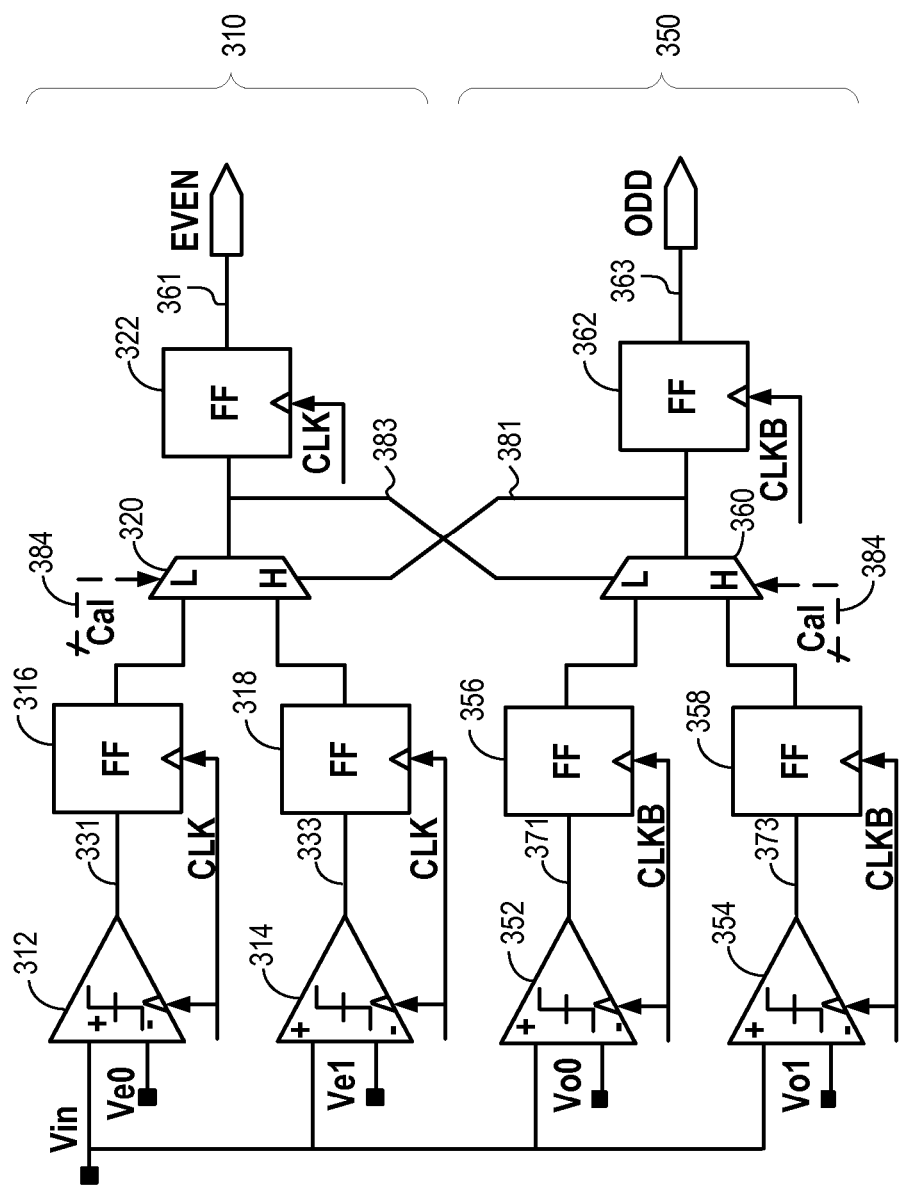
FIG. 3 illustrates a decision feedback equalizer circuit according to one embodiment.

FIG. 3 illustrates an example embodiment of one decision feedback equalizer 300 that could be used as decision feedback equalizer 152. In the illustrated embodiment, decision feedback equalizer (DFE) 300 comprises a double data rate (DDR) single-tap partial-response architecture. DFE 300 comprises a first sampling circuit (e.g., even sampling circuit 310) and a second sampling circuit (e.g., odd sampling circuit 350). The sampling circuits 310, 350 sample symbols of the input symbol. In many embodiments, the symbol comprises a single bit, but in alternative embodiments the sampling circuits 310, 350 can sample multi-bit symbols, e.g., using 4-PAM signaling. Thus, references to a "bit" or "bit stream" herein can, in alternative embodiments, be replaced with a multi-bit symbol or symbol stream. Even sampling circuit 310 includes comparators 312, 314, flip-flops 316, 318, 322, and multiplexer 320. Odd sampling circuit 350 includes comparators 352, 354, flip-flops 356, 358, 362, and multiplexer 360. In alternative embodiments, different or additional components may be included. Note also that comparators 312, 314, 352 or 354 can include any type of circuit that provides a decision regarding a data level of the input signal, including any type of sampler or similar circuitry.

Even sampling circuit 310 produces a first output bit stream (e.g., even output bit stream 361) comprising bits sampled at a first set of sample instants corresponding to a first half-data rate clocking signal CLK. Specifically, comparator 312 periodically samples $V_{IN}$ by comparing $V_{IN}$ to a first reference signal Ve0 (e.g., a voltage) on even phase sampling instants based on a particular edge of the clocking signal CLK. Comparator 312 outputs a first comparison signal 331 (e.g., a bit) to flip-flop 316. In one embodiment, comparison signal 331 is a digital signal that represents a first logic level (e.g., logic high) when $V_{IN}$ is higher than Ve0 and a second logic level (e.g., logic low) when $V_{IN}$ is lower than Ve0 at the sampling instant. Similarly, comparator 314 periodically samples $V_{IN}$ by comparing $V_{IN}$ to a second reference signal Ve1 on the even phase sampling instants based on the particular edge of CLK and outputs a second comparison signal 333 to flip-flop 318. Multiplexer 320 selects between the comparison signals 331, 333 based on select line 381. The output of multiplexer 320 provides even output 361 via flip-flop 322.

Odd sampling circuit 350 operates similarly to even sampling circuit 310 described above, except that comparators 352, 354 sample $V_{IN}$ at sampling instants that correspond to an edge of a second clocking signal CLKB (e.g. an inverted version of clocking signal CLK). Thus, for example, even sampling circuit 310 may sample based on rising edges of CLK and odd sampling circuit 350 may sample based on falling edges of CLK or vice versa. Comparators 352, 354 of odd sampling circuit 350 use references Vo0, Vo1 respectively to generate comparison signals 371, 373 respectively. Comparison signals 371, 373 are temporarily stored to flip-flops 356, 358 respectively, and multiplexer 360 selects between them based on select line 383. The output of multiplexer 360 provides odd output 363 via flip-flop 362.

The output of multiplexer 360 of odd sampling circuit 350 is also coupled to control select line 381 of multiplexer 320 of even sampling circuit 310, thereby selecting between the two comparison signals 331, 333 produced by comparators 312 and 314. In this way, the current output bit appearing at even output 361 of even sampling circuit 310 is chosen between two possible comparison bits 331, 333, with the selection depending on the logic level (e.g., logic low or logic high) of the immediately prior sample, which appears at odd output 381 of multiplexer 360. Thus, if the prior sample outputted by multiplexer 360 was logic low, multiplexer 320 will be configured so that even output 361 represents a comparison between $V_{IN}$ and Ve0. Otherwise, if the prior sample outputted by multiplexer 360 was logic high, multiplexer 320 will be configured so that the even output 361 instead represents the comparison between $V_{IN}$ and Ve1.

Similarly, the output of multiplexer 320 of even sampling circuit 310 is coupled to select line 383 of multiplexer 360 of odd sampling circuit 350, thereby selecting between the two comparison signals 371, 373 produced by odd sampling circuit 350. Thus, an output bit of odd sampling circuit 350 is chosen between two possible comparison bits 371, 373, with the selection depending on the logic level of the prior sample, which appears at even output 383 of multiplexer 320.

In one embodiment, for the purpose of calibration, the multiplexers 320, 360 can also be digitally controlled during calibration (for example, via an external calibration control signal) to force the multiplexer 320, 360 into a particular state in which it selects a predetermined one of the inputs regardless of the select lines 381, 383; such a condition is also represented by optional control signal inputs 384 (represented as phantom lines to indicate their optional nature). Alternatively, the select lines 381, 383 can be digitally controlled during calibration by a calibration control signal so that the select lines 381, 383 can be forced to a particular state regardless of the input signals or prior output bits.

Note that in practice, a DDR partial-response DFE such as illustrated in FIG. 3 can have greater or fewer components. For example, it is known to use data latches in between one or both outputs of multiplexers 320 and 360 and the selection input for the ensuing multiplexer 360 and 320, to guarantee avoidance of a race condition. Other techniques also exist for avoiding a race condition, such as providing for variable clock selection for flip-flops 322/362 (so as to sample multiplexer output at a time guaranteed to be stable, relative to sample and hold timing for the particular circuit), or using alternate logic designs (e.g., that advance one or both multiplexers 320/360 to a point in front of the first flip-flop stage, represented by some or all of flip-flops 316, 318, 356 and 358). Other techniques also exist that may or may not involve calibration of race-free data transfer. Finally, while the partial response DFE 300 was described as using normal and inverted half-data-rate sampling clocks (CLK/CLKB), it is also possible to use a single timing signal with the individual comparators being clocked by opposed edge transitions (e.g., low-to-high and high-to-low, respectively).

Controlling partial-response DFE 300 to sample $V_{IN}$ using different references depending on the logic level of the prior sample is a useful technique for compensating for inter-symbol interference. If the logic level of the prior sample is known, it is possible to predict the distortion that will be incurred to the current sample and set the reference signal appropriately to compensate for the predicted distortion. Thus, in the architecture of FIG. 3, two samples are produced for each incoming bit using two different references with one sample being accurate if the prior bit was logic high and one sample being accurate if the prior bit was logic low. The appropriate sample is then selected once the logic level of the prior bit appears at the output.

References Ve0, Ve1, Vo0, Vo1 can be independently set relative to one another to compensate for both different offsets of comparators 312, 314, 352, 354, and to compensate for differing levels of inter-symbol interference resulting from whether the prior bit was logic low or logic high. Given knowledge of how logic low and logic high signals will appear at each comparator (taking comparator offset and inter-symbol interference into account), the reference for that comparator can be set at or near the midpoint between logic low and logic high bits to allow comparators 312, 314, 352, 354 to best discriminate between logic levels. For example, in one embodiment, the references are set as follows:

$$Ve0 = V1_{OS} - \alpha_{DFE} \quad (1)$$

$$Ve1 = V2_{OS} + \alpha_{DFE} \quad (2)$$

$$Vo0 = V3_{OS} - \alpha_{DFE} \quad (3)$$

$$Vo1 = V4_{OS} + \alpha_{DFE} \quad (4)$$

Note that the values $Vn_{OS}$ are not called out in FIG. 3.

In the above equations, logic low and logic high of the transmitted signal correspond to −1 and 1 respectively for ease of computation. Thus, absent any offset voltage or inter-symbol interference effect, the reference voltages are set to zero, midway between logic high and logic low. $\alpha_{DFE}$ represents a level of inter-symbol interference effect as illustrated in FIG. 2. For example, when the previously transmitted bit was logic low, the currently transmitted bit will appear reduced by a value $\alpha_{DFE}$ due to inter-symbol interference from (or slow rise time relative to) the previous bit. When the previously transmitted bit was logic high, the currently transmitted bit will appear raised by a value $\alpha_{DFE}$ due to inter-symbol interference (or slow decay time) from the previous bit. Thus, to compensate, $\alpha_{DFE}$ is subtracted from the references Ve0 and Vo0 because these references are used when the previous bit was logic low, and $\alpha_{DFE}$ is added to reference voltages Ve1 and Vo1 because these references are used when the previous bit was logic high.

Offsets $V1_{OS}$, $V2_{OS}$, $V3_{OS}$, $V4_{OS}$ compensate for different input offsets of comparators 312, 314, 352, 354. The offset of a comparator represents the difference between the voltages applied to the input terminals of the comparator when the output of the comparator is at the theoretical threshold between when the comparator outputs logic high and logic low. While an ideal comparator would have an offset voltage of zero, some finite offset is usually present and may vary between comparators based on differing manufacturing and operating conditions.

Calibration Process

Figure 4A:
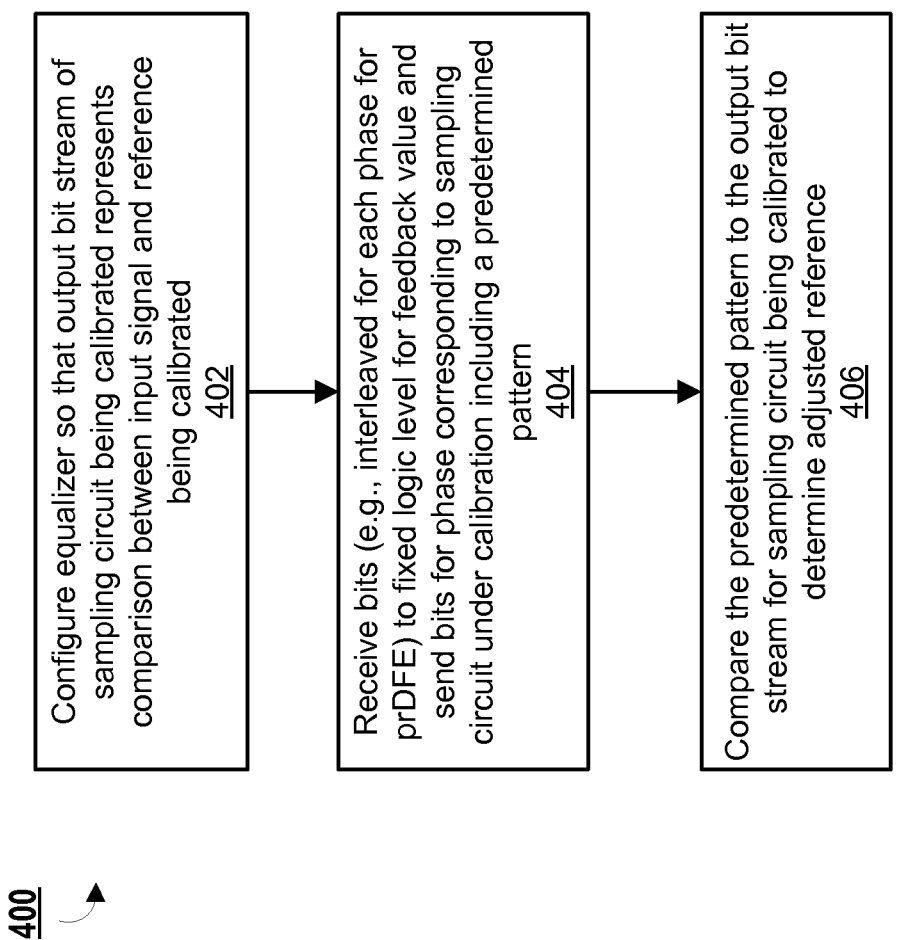
FIG. 4A illustrates a flowchart of a first process for calibrating a decision feedback equalizer circuit, according to one embodiment.

In a calibration process, error comparator 154 determines references Ve0, Ve1, Vo0, Vo1 that compensate for both the individual offsets of various comparators 312, 314, 352, 354 and for inter-symbol interference effects as described in equations (1)-(4) above. FIG. 4A is a flowchart illustrating a general process 400 for calibrating one of the references. The process can be applied separately for each of the references to independently calibrate each of the references.

In one embodiment of the calibration process 400, an error comparator configures the partial-response DFE so that the output bit stream of one of the sampling circuits being calibrated (e.g., even sampling circuit or odd sampling circuit) represents a comparison between $V_{IN}$ and the specific reference signal being calibrated (i.e., Ve0, Ve1, Vo0, or Vo1). This is represented by reference numeral 402 in FIG. 4. The partial-response DFE then, per reference numeral 404, receives interleaved bits for each phase (e.g., even and odd). The received sequence represents a transmit sequence in which bits for each data phase not being calibrated are forced to a high or low state, so as to guarantee selection of the comparator being calibrated by forcing the other comparators to the same high or low state. Note that comparators not being calibrated may have incorrect reference voltages as they may have not been calibrated yet, so this forcing permits each comparator to be calibrated in turn. The input bits corresponding to the phase of the input signal being calibrated represent a known pattern and second bits corresponding to the other or previous phase of the input signal represent a fixed logic level (e.g., either logic high or logic low so as to guarantee ensuing comparator isolation and a known inter-symbol interference pattern). The error comparator then compares (per numeral 406) the known pattern to the output of the sampling circuit being calibrated to determine an adjusted reference (e.g., based on bit error measurement relative to the known pattern). Thus, first input bits and second input bits corresponding to these phases are interwoven such that variation of symbol values presented by the known pattern can be used to identify offset affecting the associated comparator and the optimal decision threshold.

Note that there are different ways of obtaining this result: (a) the transmitter can be controlled to send digital values representing the known pattern (e.g., +1/−1) while the receiver sweeps its threshold to identify (e.g., based on a range of acceptable bit error rate results) a data eye midpoint; and (b) the transmitter can be controlled to send intermediate voltages (e.g., between +1/−1) to identify the approximate offset/voltage threshold where bit error rate is minimized, and where type 1 and type 2 errors are each 50% likely. Also, note that different approaches exist for forcing the output of sampling circuits whose offsets are not being calibrated: (a) Their reference voltages can be forced to a very low or a very high value such that they produce a constant output regardless of input level; (b) they can have an internal circuit mechanism to keep sampling circuits at a reset state where output is held at a constant level regardless of input; or (c) the output of multiplexers 360 and/or 320 in FIG. 3 can be forced to a known state using control signal 384. Note that interleaving the calibration pattern combined with forcing the output of other sampling circuits isolate the comparator under calibration and guarantees a predictable interference pattern when the comparator is used.

The technique just mentioned can be applied to traditional DFE schemes (e.g., not necessarily relying on partial-response design); that is, feedback provided from a prior sample (e.g., "3 unit intervals old") can be configured via a repeating bit pattern, e.g., "x100x100x10," where the "x" represents varying bit values or voltage values corresponding to a predetermined sequence, i.e., both this value of x is predetermined, as is the repeating bit pattern. The bit error rate in samples corresponding to receipt of "bit x" is tested while varying DFE threshold level for a feedback tap corresponding to "a latency of three unit intervals and an ISI pattern of 100" while forcing the output of the sampler to 1, 0, and 0 when other bits are received, until bit errors are equally like to be "ones" or "zeros." Such a scheme is further shown below with respect to FIG. 9.

Figure 4B:
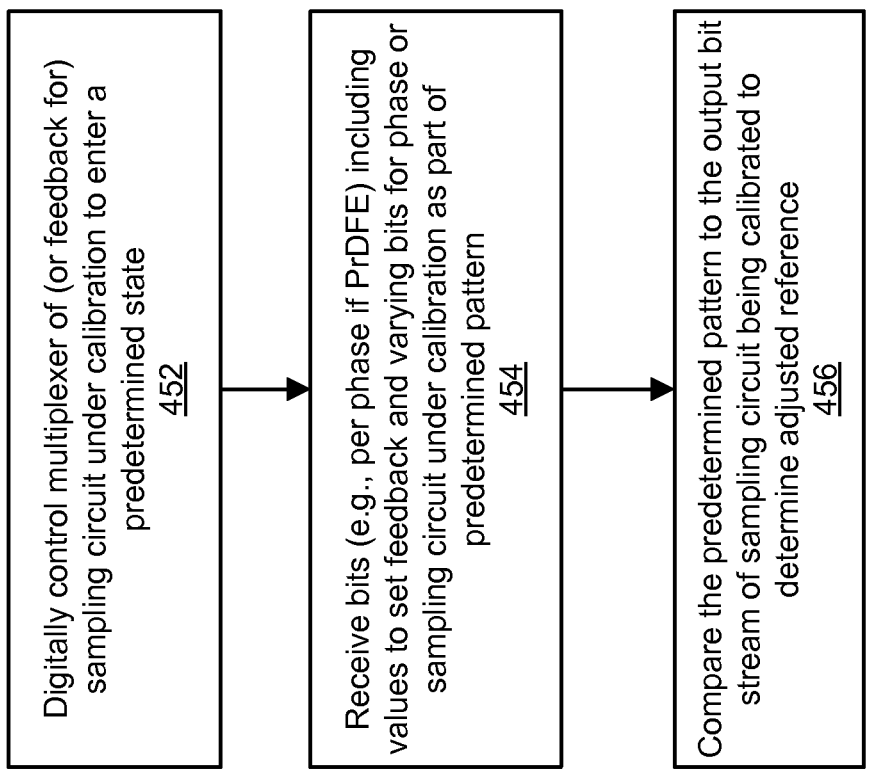
FIG. 4B illustrates a flowchart of a second process for calibrating a decision feedback equalizer circuit, according to one embodiment.

FIG. 4B is a flowchart illustrating an alternative embodiment of the calibration process that can be used in place of the calibration process 400 described above. In this embodiment, multiplexers can be digitally controlled during calibration so that they can be forced into a particular state regardless of the select line, as indicated by reference numeral 452 in FIG. 4. Alternatively, the select line itself can be digitally controlled to force the multiplexer into a particular state regardless of the input signal and the outputs of the other sampling circuits. The effect of these operations is to separate comparator isolation from the intersymbol interference pattern present in the signal. The calibration process then continues similarly as described above, as indicated by reference numerals 454 and 456. Note that this technique as well can be applied to traditional DFE designs, i.e., as indicated by reference numeral 452, feedback from a prior digital symbol can be controlled using structure inside of the receiver to provide a predetermine logic state in the place of a prior digital symbol of specific latency. As with the previously-mentioned technique, this result can be obtained in one embodiment by manipulating the bit pattern sent to the particular receiver, and in another embodiment, using hardware within the receiver to force a specific feedback bit logic state irrespective of the transmitted value for that bit.

FIGS. 5A-5D are used to illustrate a calibration process iteratively applied to the four-comparator partial-response DFE 300 from FIG. 3. That is, the calibration process is performed in four iterations to respectively calibrate references Ve1, Ve1, Vo0, Vo1 for a DDR implementation.

Figure 5A:
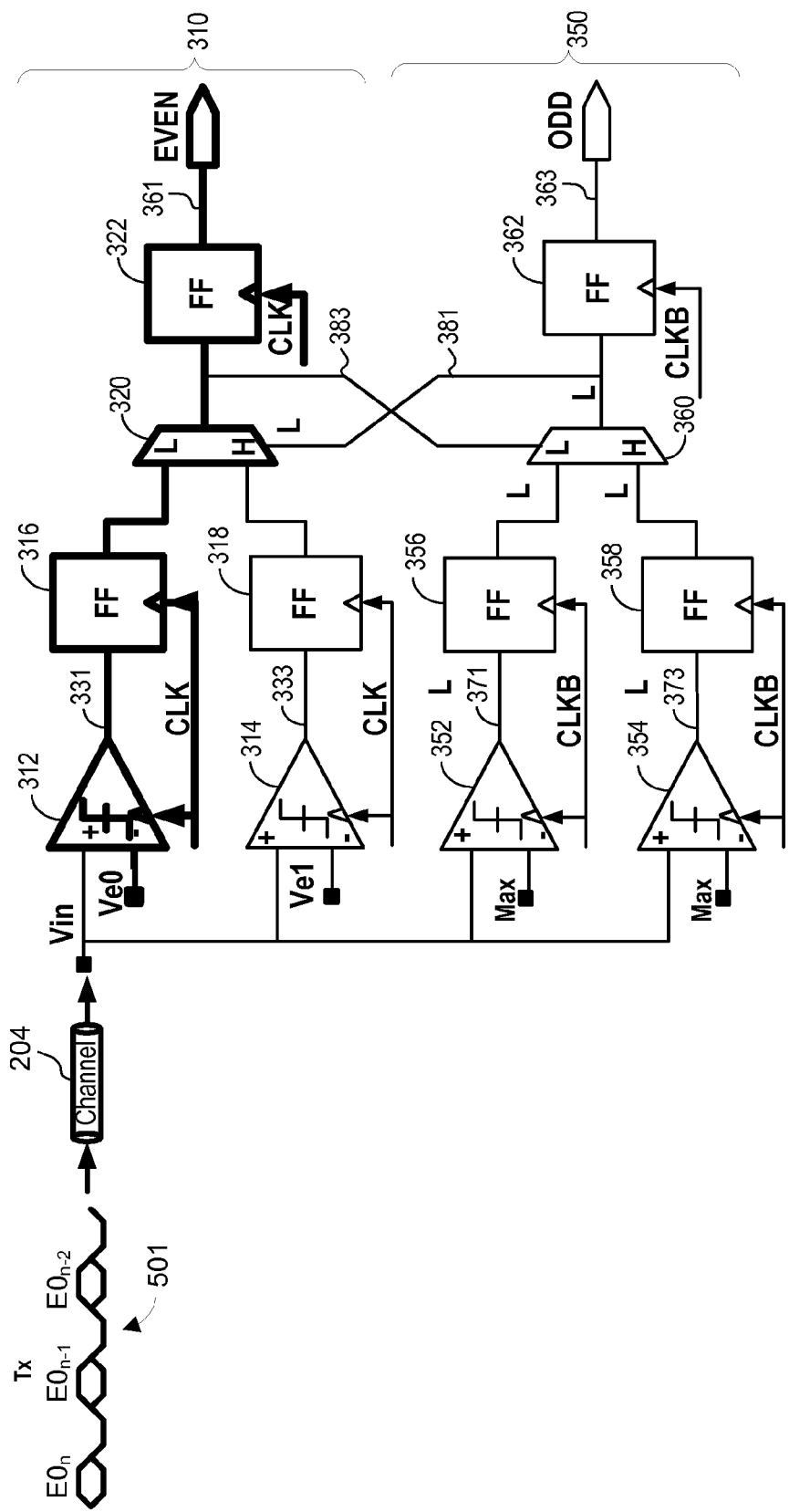
FIG. 5A is circuit diagram illustrating a technique for calibrating a first comparator of a decision feedback equalizer circuit, according to one embodiment.

FIG. 5A illustrates an application of the calibration process to calibrate reference Ve0 of even sampling circuit 310 during a first calibration period. Using the cross-coupling between sampling circuits, the odd sampling circuit 350 can be configured such that the odd output 162 (and therefore select line 381) is forced to a logic level that causes the even output 361 to represent the comparison between $V_{IN}$ and Ve0. Particularly, in one embodiment, reference signals Vo0 and Vo1 of the odd sampling circuit 350 are set to a predetermined level that forces outputs of both comparators 352, 354 of the odd sampling circuit 350 to logic low (represented by 'L' in FIG. 5A); for example, by setting reference voltages Vo0 and Vo1 to values greater than or equal to the maximum value of $V_{IN}$, outputs 371, 373 of the comparators 352, 354 will both be logic low regardless of $V_{IN}$. As a result, output 381 of multiplexer 360 will also be logic low, regardless of the value of select line 383. Thus, multiplexer 320 of even sampling circuit 310 will select comparison result 331 and even output 361 will necessarily represent the comparison 331 between $V_{IN}$ and Ve0. Configuring references Vo0 and Vo1 may be accomplished, for example, by setting an appropriate output of error comparator 154 or setting a control signal using a register (e.g., on board an integrated circuit receiver). Alternatively, as described above, the multiplexer 360 or select line 383 can be digitally controlled directly so that it is forced to select comparison result 331.

An input signal 501 is then sent to receiver 150 via channel 104 (e.g., from transmitter 102) and is received as $V_{IN}$. Input signal 501 has even bits corresponding to an even phase and odd bits corresponding to an odd phase of input signal 501. The even bits corresponding to the even phase (represented by 'E0' in FIG. 5A) include a known bit pattern and the odd bits corresponding to the odd phase represent a fixed logic level (i.e., logic low in FIG. 5A). By setting the odd bits to logic low, the operational conditions when reference Ve0 would be used are simulated, because multiplexer 320 will only select comparison result 331 using reference Ve0 when the previous odd bit is logic low. Thus, the level of inter-symbol interference appearing during the calibration will closely estimate the actual inter-symbol interference during operation when reference Ve0 is used.

To determine how to set Ve0, error comparator 154 varies Ve0 while sampling the input signal 501 and determines a variation of error rates between the known pattern of input signal 501 and the output signal 361. Ve0 is then updated based on the variation of the error rates. For example, in one embodiment, error comparator 154 sweeps Ve0 across a predetermined range to determine when the comparison of the known pattern and the even output data stream achieves a predetermined criterion based on the bit error rates. Ve0 is then adjusted to a value when the predetermined criterion was met during the sweep. More specifically, in one embodiment, error comparator 154 sweeps Ve0 while concurrently monitoring a bit error rate between even output bit stream 361 and the known pattern used during the even phase of the input signal 501. The bit error rate is compared to a threshold error rate throughout the sweep. Error comparator 154 determines a "pass" range of Ve0 where the measured error rate is below the threshold error rate. Typically, the bit error rate will be above the threshold error rate at both the low and high ends of the sweep range, and will be below the threshold error rate for some middle portion of the sweep range. The midpoint of the detected pass range of Ve0 represents a desirable value for Ve0 as it estimates the halfway point between a logic high bit and a logic low bit as perceived by comparator 312 taking both offset and inter-symbol interference into account at the same time. Thus, in one embodiment, error comparator 154 sets Ve0 to this determined midpoint of the pass range following calibration. As mentioned, transmitter voltage can in some embodiments also be set to values intermediate to high and low logic levels (e.g., intermediate to +1/−1) to provide additional granularity in finding the midpoint of the receiver data eye (i.e., that point where bit error rate is minimized and for errors that do occur, where type 1 and type 2 errors are each 50% likely). Also, in such an embodiment, note that it is not necessarily required to sweep threshold voltage across the entire range of values, i.e., depending on granularity in finding midpoint of the pass range, the calibration process can cease upon detecting that midpoint.

Figure 5B:
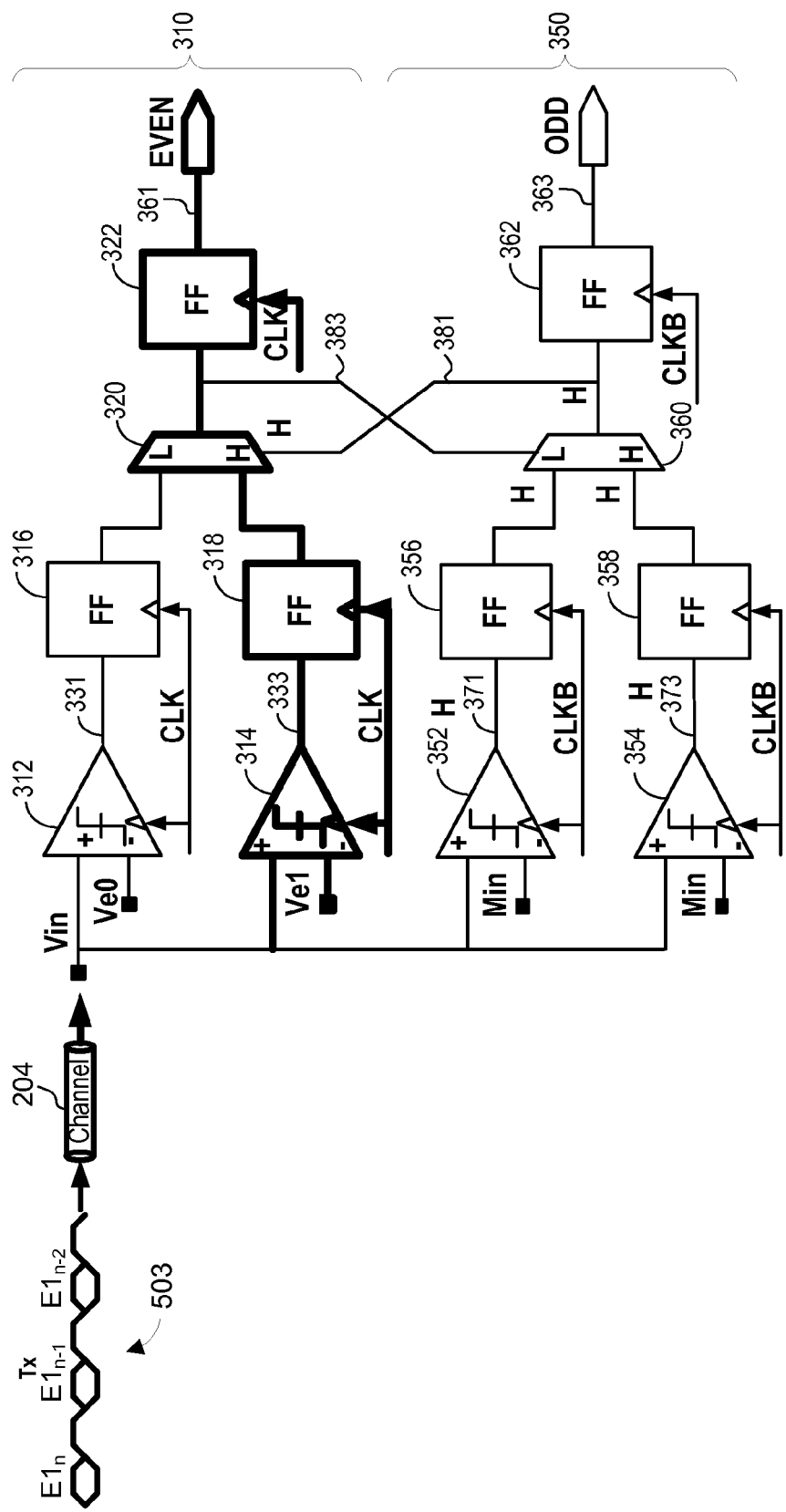
FIG. 5B is circuit diagram illustrating a technique for calibrating a second comparator of a decision feedback equalizer circuit, according to one embodiment.

FIG. 5B illustrates a similar process for calibrating reference Ve1 of even sampling circuit 310 during a second calibration period. Here, references Vo0 and Vo1 of odd sampling circuit 350 are instead set to predetermined values that force outputs of both comparators 352, 354 of the odd sampling circuit 350 to logic high (represented by 'H' in FIG. 5B). For example, by setting reference voltages Vo0 and Vo1 less than or equal to the minimum value of $V_{IN}$, the outputs 371, 373 of comparators 352, 354 will both be logic high regardless of $V_{IN}$. As a result, output 381 of multiplexer 360 will also be logic high, regardless of select line 383. Thus, multiplexer 320 of even sampling circuit 310 will now select comparison signal 333 and even output 361 will represent the comparison 333 between $V_{IN}$ and Ve1. Alternatively, multiplexer 320 can be digitally forced to select comparison signal 333 as described above.

An input signal 503 is then sent to the receiver 150 that has odd bits set to logic high, and the even bits set (represented by 'E1' in FIG. 5B) to a known pattern that may be the same or different than the known pattern of FIG. 5A. By setting the odd bits all to logic high, the calibration process mimics the operational conditions when reference Ve1 is used, because multiplexer 320 will only select comparison result 333 using reference Ve1 when the previous odd bit is logic high. Error comparator 154 sweeps Ve1 across its range while concurrently monitoring a bit error rate between the even output bit stream 361 and the known bit pattern of the even bits of the input signal 503. Error comparator 154 then sets Ve1 based on the comparison as described above.

Figure 5C:
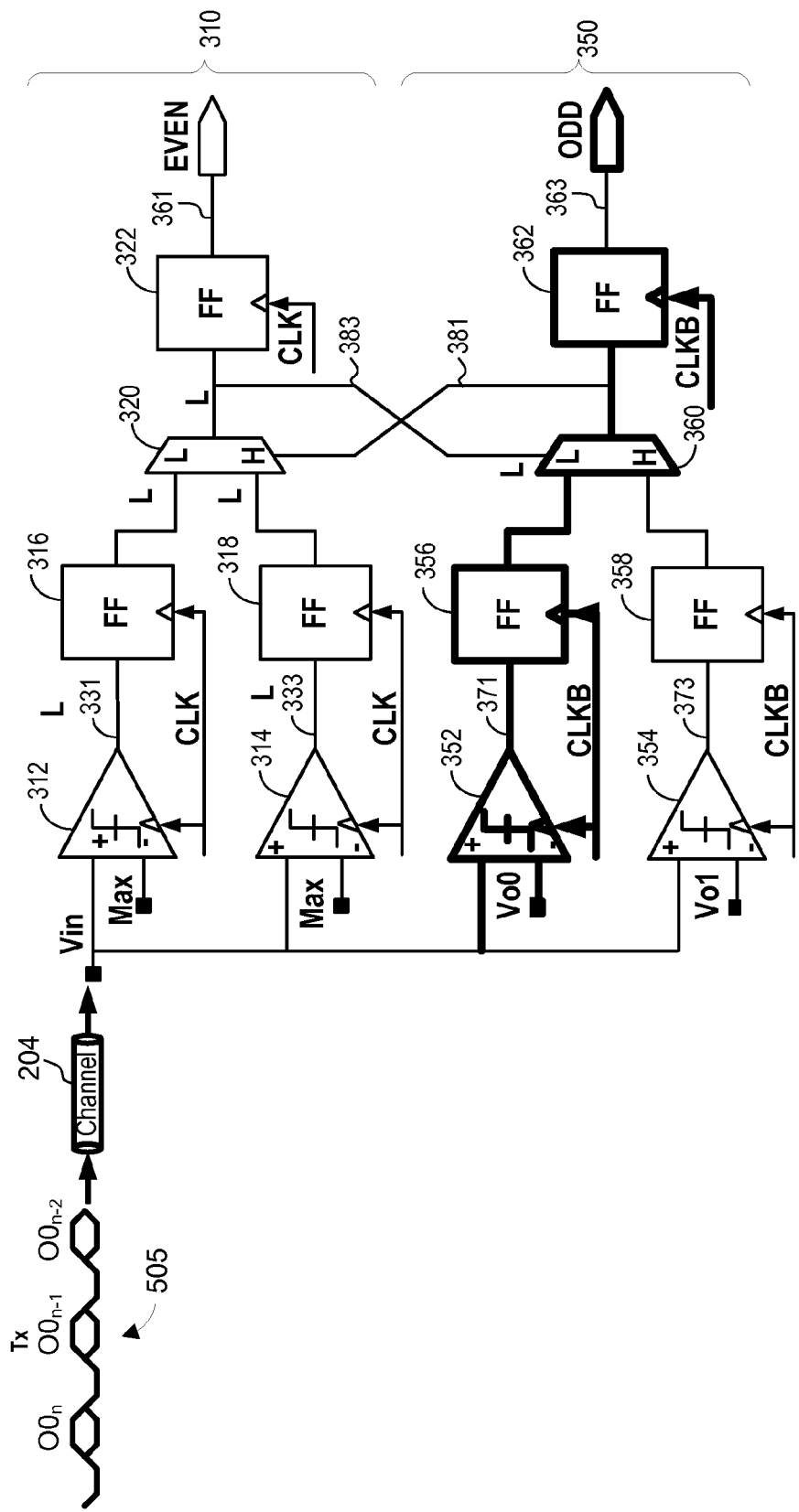
FIG. 5C is circuit diagram illustrating a technique for calibrating a third comparator of a decision feedback equalizer circuit, according to one embodiment.
Figure 5D:
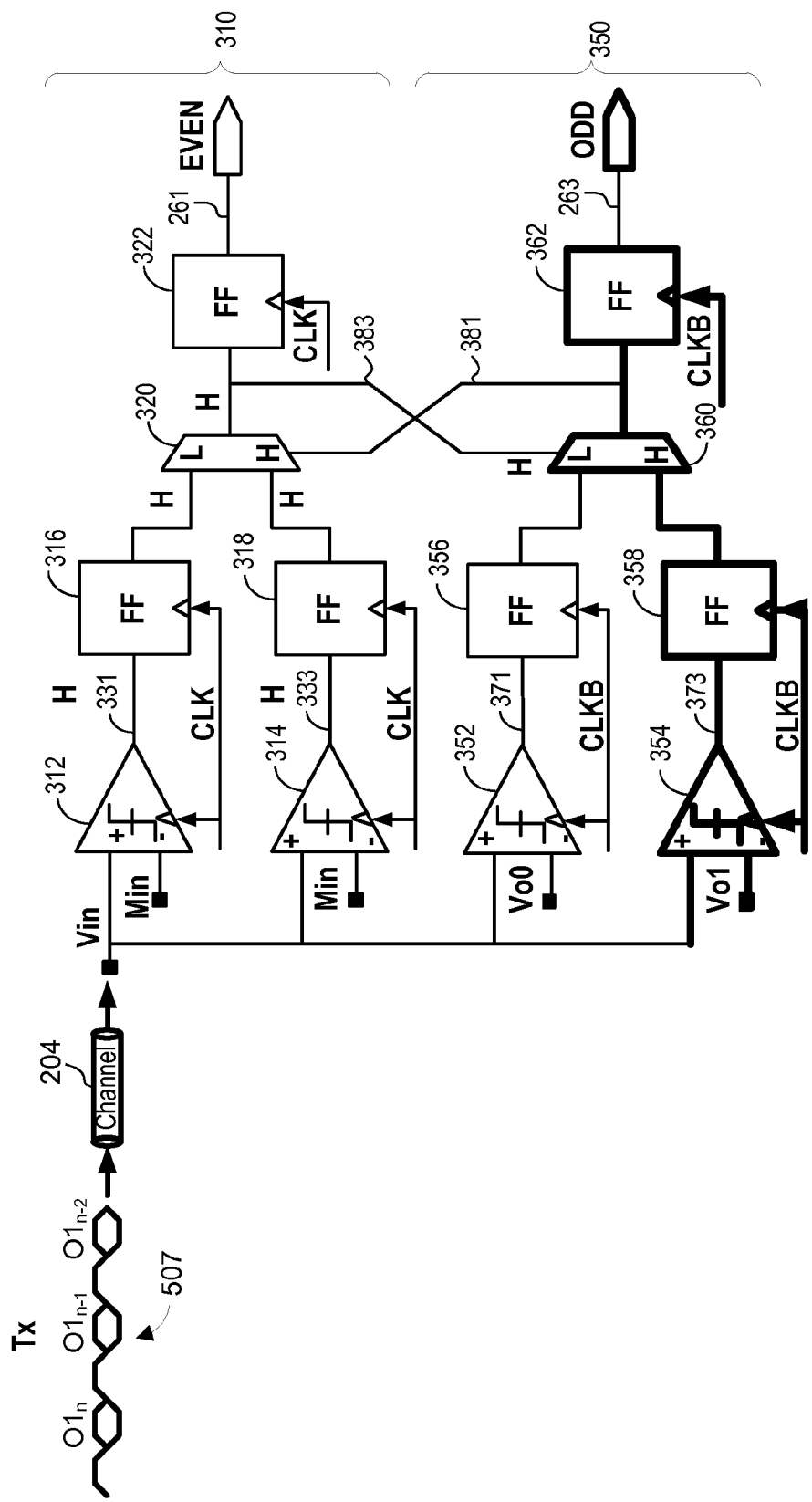
FIG. 5D is circuit diagram illustrating a technique for calibrating a fourth comparator of a decision feedback equalizer circuit, according to one embodiment.

FIG. 5C-5D illustrate techniques for calibrating the odd sampling circuit 350 using an analogous procedure to calibration of the even sampling circuit 310 discussed above. Thus, to calibrate reference Vo0 during a third calibration period, references Ve0 and Ve1 are set to first predetermined values (e.g., maximum values) so that odd output 363 tracks the comparison signal 371, and an input signal 505 is applied that has odd bits (represented by 'O0' and 'O1' respectively in FIGS. 5C-D) set to logic low and even bits set to a known bit pattern. To calibrate reference Vo1, references Ve0 and Ve1 are set to second predetermined values (e.g., minimum values) so that odd output 363 tracks the comparison signal 373 and an input signal 507 is applied that has odd bits set to logic high and even bits set to a known bit pattern. Error comparator 154 then sets references Ve0 and Ve1 based on measured bit error rates, as described above.

Alternative Architecture for Double Data Rate Decision Feedback Equalizer

Figure 6:
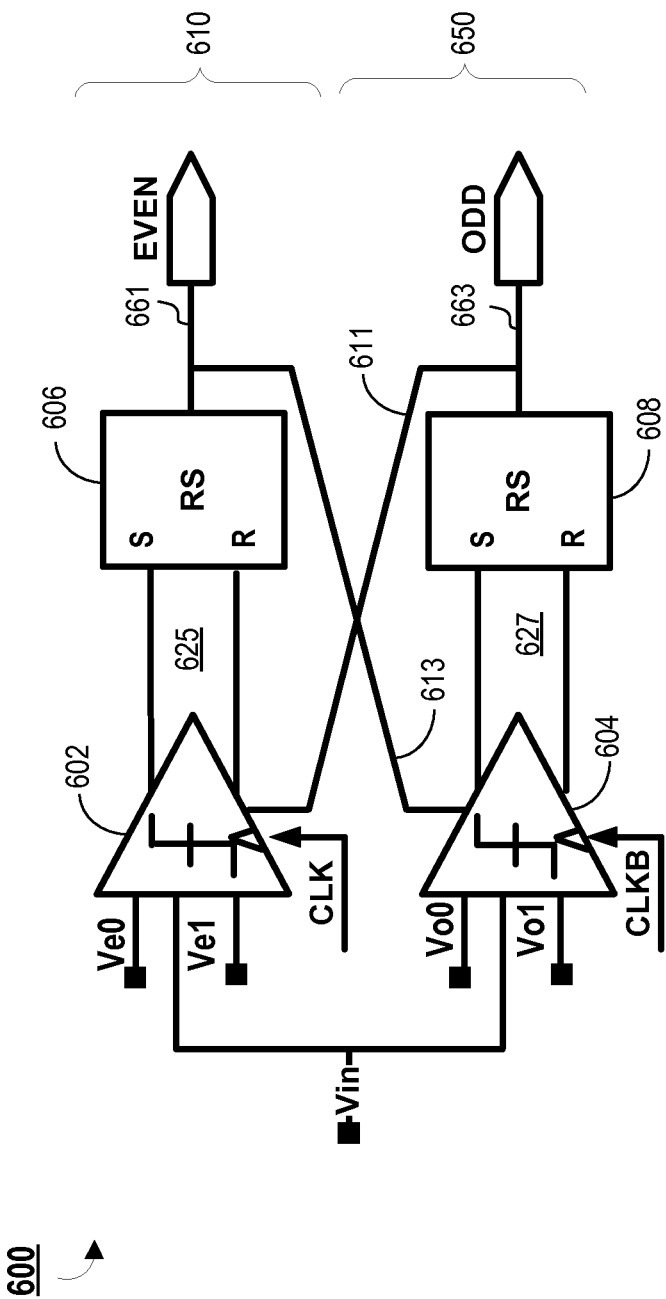
FIG. 6 illustrates a decision feedback equalizer circuit, according to a second embodiment.

FIG. 6 illustrates an embodiment of a DFE 600 having an alternative architecture that could be used in place of partial-response DFE 300 described above. DFE 600 comprises an even sampling circuit 610 and an odd sampling circuit 650. Even sampling circuit 610 comprises a clocked comparator 602 and an RS latch 606. Clocked comparator 602 receives an input signal $V_{IN}$, two references Ve0, Ve1, a clock signal CLK, and a select line 611. Using sample instants of CLK (e.g., once per clock period on a rising or falling edge), clocked comparator 602 compares $V_{IN}$ to either Ve0 or Ve1 and outputs a comparison as differential signal 625 to RS latch 606. Clocked comparator 602 chooses which reference to use based on selected line 611. When differential signal 625 is logic high (i.e., the selected reference signal is higher than $V_{IN}$), the output of RS latch 606 is set and a logic high bit is outputted to even output 661. When differential signal 625 is logic low (i.e., the selected reference signal is lower than $V_{IN}$), the output of RS latch 606 is reset and a logic low bit is outputted to even output 661.

Similarly, odd sampling circuit 650 comprises a clocked comparator 604 and an RS latch 608. Clocked comparator 604 receives input signal $V_{IN}$, two references Vo0, Vo1, a clock signal CLKB, and a select line 613. Based on sample instants of CLKB (which may correspond to second phase of CLK), clocked comparator 604 compares $V_{IN}$ to either Vo0 or Vo1 (based on select line 613) and outputs a comparison as differential signal 627 to RS latch 608. RS latch 608 provides odd output 663 based on comparison result 627.

Even output 661 is coupled to control select line 613 of comparator 604 and odd output 663 is coupled to control select line 611 of comparator 602. Thus, the selection of which reference to use in the following phase comparisons depends on the prior output bit. Error comparator (not shown in FIG. 6) can calibrate references Ve0, Ve1, Vo0, V01 of DFE 600 using the same calibration process described above.

An advantage of the architecture of DFE 600 is that it may utilize less physical area on an integrated circuit chip than partial-response DFE 300, and may provide better power efficiency because fewer comparisons are performed per clock cycle.

Quad Data Rate Decision Feedback Equalizer

Figure 7:
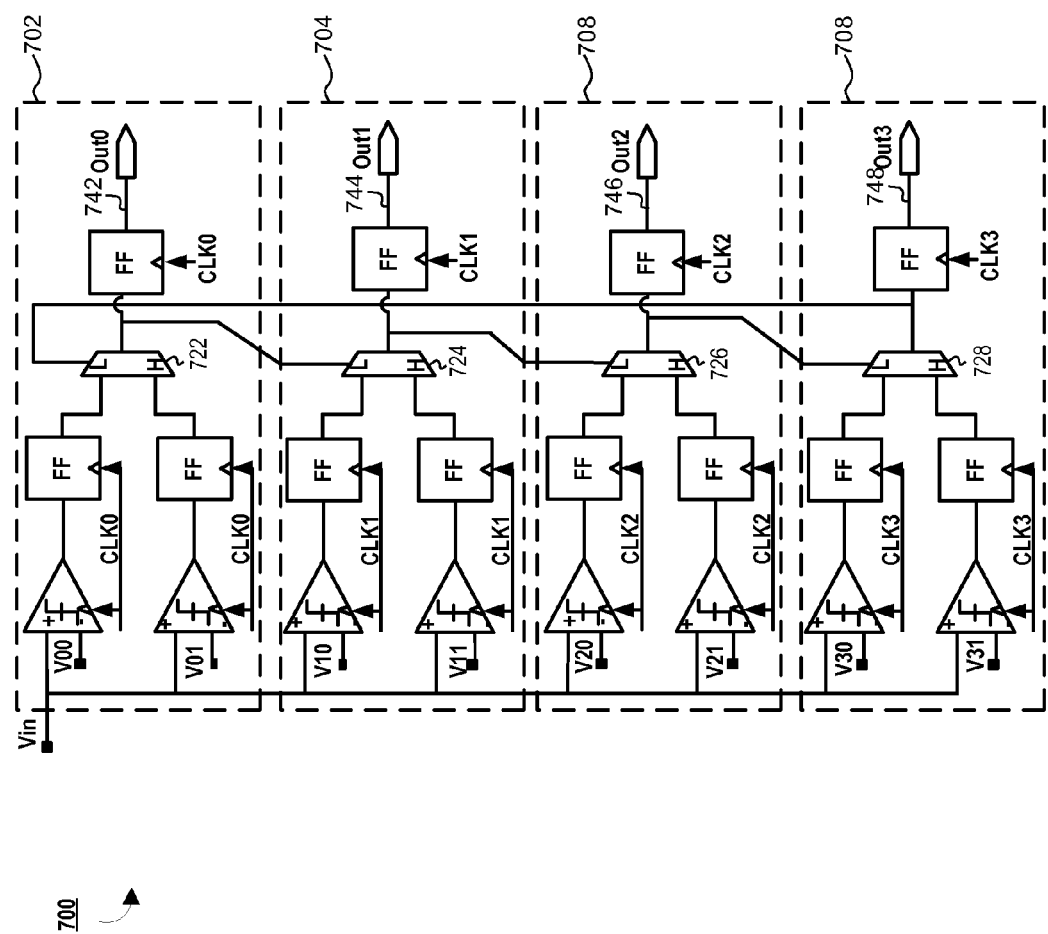
FIG. 7 illustrates a quad-rate decision feedback equalizer circuit according to another embodiment.

FIG. 7 illustrates an example architecture for a quad data rate (QDR) partial-response DFE 700. DFE 700 has four sampling circuits 702, 704, 706, 708 coupled to receive an input signal $V_{IN}$ and produce outputs 742, 744, 746, 748 respectively. DFE 700 treats $V_{IN}$ as being a quad date rate input signal having four phases. Thus, first sampling circuit 702 samples $V_{IN}$ according to a first set of sample instants corresponding to a first clock phase (represented by CLK0 in FIG. 7); second sampling circuit 704 samples $V_{IN}$ according to second set of sample instants corresponding to a second clock phase (represented by CLK1 in FIG. 7); third sampling circuit 706 samples $V_{IN}$ according to a third set of sample instants corresponding to a third clock phase (represented by CLK2 in FIG. 7); and fourth sampling circuit 708 samples $V_{IN}$ according to a fourth set of sample instants corresponding to a fourth clock phase (represented by CLK3 in FIG. 7).

Each sampling circuit 702, 704, 706, 708 comprises a partial response architecture as described above in which multiplexers 722, 724, 726, 728 respectively select between two comparisons using different references (V00 or V01 for first sampling circuit 702; V10 or V11 for second sampling circuit 704; V20 or V21 for third sampling circuit 706; and V30 or V31 for fourth sampling circuit 708). Multiplexers 722, 724, 726, 728 are controlled based on the data sample from the immediately-previous phase. Thus, for example, multiplexer 724 of second sampling circuit 704 is controlled by outcome of first sampling circuit 702; multiplexer 726 of third sampling circuit 706 is controlled by outcome of second sampling circuit 704, multiplexer 728 of fourth sampling circuit 708 is controlled by outcome of third sampling circuit 706; and multiplexer 722 of first sampling circuit 702 is controlled by outcome of fourth sampling circuit 708. This example can be extended to any number of phases in a data signal, e.g., 3, 4, 5, . . . 8, etc.

The calibration process described above in FIGS. 4A-4B and 5A-5D can be used to calibrate decision feedback equalizer 700. For example, to calibrate reference V00 of first sampling circuit 702, error comparator 154 sets references V30 and V31 to appropriate values to ensure that multiplexer 722 always selects the comparison between $V_{IN}$ and V00 (or alternatively, digital controls multiplexer 722 directly to select the comparison between $V_{IN}$ and V00). An input signal is received having four phases, with the input bits corresponding to the first phase having a known bit pattern and the input bits corresponding to the immediately prior phase (in the case the fourth phase) set to a predetermined logic level (e.g., logic low to select reference V00). In one embodiment, in addition to setting the immediately prior phase to the predetermined logic level, the input signal may have all of the prior phases set to predetermined logic levels so that the inter-symbol interference effect from multiple prior symbols can be better estimated and accounted for when setting the references. For example, in one embodiment the logic levels for all phases except for the one under calibration may be set to the same predetermined value. In other embodiments, a known sequence of logic levels may be used that may differ between periods of the input signal to provide statistically useful information about the inter-symbol interference observed during calibration.

The known bit pattern for the phase under calibration is then compared to the output of the first sampling circuit 702 to determine an adjusted value for V00. The remaining references V01, V10, V11, V20, V21, V30, V31 may be calibrated using a similar approach by setting appropriate references of other sampling circuits not being calibrated and comparing an appropriate input signal to the output.

In alternative embodiments, different internal architectures for the sampling circuits 702, 704, 706, 708 may be used. For example, in one embodiment, a regenerative architecture such as that illustrated in FIG. 6 may be used in place of the partial-response DFE illustrated in FIG. 7. Furthermore, in other alternative embodiments, the same principles may be applied to architectures having more than four sampling circuits and more than four input/output phases. For example, 6-phase or 16-phase architectures may be used.

Multi-Tap Decision Feedback Equalizer

Figure 8:
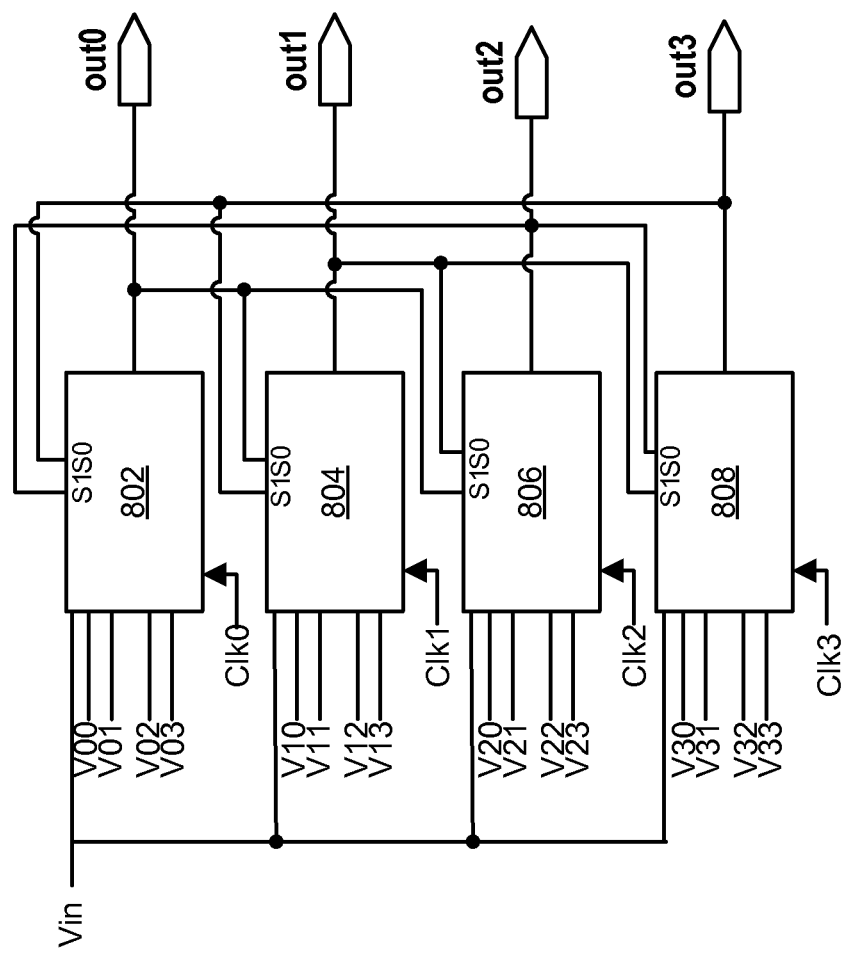
FIG. 8 illustrates a multi-tap decision feedback equalizer circuit according to another embodiment.

In yet another embodiment, a multi-tap partial-response DFE may be used as a decision feedback equalizer. FIG. 8 illustrates an example architecture of a two-tap structure 800. In a two-tap structure 800, an input signal $V_{IN}$ is sampled using one of four references selected based on the two previous data samples rather than just the immediately-previous sample. Thus, for example, each sampling circuit (or set of comparators) may compare $V_{IN}$ to four different references given by:

$$Vx0 = Vx0_{OS} + \alpha_{DFE} + \beta_{DFE} \quad (5)$$

$$Vx1 = Vx1_{OS} + \alpha_{DFE} - \beta_{DFE} \quad (6)$$

$$Vx2 = Vx2_{OS} - \alpha_{DFE} + \beta_{DFE} \quad (7)$$

$$Vx3 = Vx3_{OS} - \alpha_{DFE} - \beta_{DFE} \quad (8)$$

where $\alpha_{DFE}$ represents the inter-symbol interference effect on a bit n from the (n-1)th bit, $\beta_{DFE}$ represents the inter-symbol interference effect on bit n from the (n-2)th bit, and $Vx0_{OS}$, $Vx1_{OS}$, $Vx2_{OS}$, $Vx3_{OS}$ represent offsets of comparators used to compare $V_{IN}$ to references Vx0, Vx1, Vx2, Vx3 respectively in any given sampling circuit. Note that once again, the offset voltages (e.g., $Vx1_{OS}$) are not depicted in FIG. 8.

The internal structures of the sampling circuits 802, 804, 806, 808 may be similar or identical to those described previously or may be implemented according to a different architecture. As illustrated, the sampling circuits 802, 804, 806, 808 sample $V_{IN}$ at different sample instances (represented by Clk0, Clk1, Clk2, Clk3) corresponding to different phases of $V_{IN}$, which in this embodiment has four phases. The sampling circuits 802, 804, 806, 808 produce corresponding outputs out1, out2, out3, out4 corresponding to samples at the respective sample instances. Each sampling circuit 802, 804, 806, 808 selects between its respective four references based on a two-bit select input S1, S0. In each sampling circuit 802, 804, 806, 808, select bits S1, S0 are controlled by the outputs of the sampling circuit corresponding to the two prior phases respectively. Thus, for example, sampling circuit 806 which samples at sample instance corresponding to a third phase selects between references V20, V21, V22, V23 based on the outputs of sampling circuit 804 and sampling circuit 802, which produced the two prior output bits.

The calibration processes described above can be applied to calibrate each of the references in the two-tap decision feedback equalizer 700. For example, to calibrate a reference of sampling circuit 802 sampling at sampling instances corresponding to a first phase, two sampling circuits sampling the input bits corresponding to the one or more phases other than the first phase (in this case, sampling circuits 806, 808) are configured to output a set of logic levels that will necessarily select the desired reference of sampling circuit 802 is selected. An appropriate input signal is then applied using the technique described above. In this particular example, the input bits for two phases immediately preceding the first phase (in this case, the third phase and fourth phase) have a first set of logic levels (e.g., a two bit sequence that uniquely corresponds to one of the four references V00, V01, V02, V03). The output of the sampling circuit 802 is compared to the known pattern in the input signal.

Multi-Tap Decision Feedback Equalizer

Figure 9:
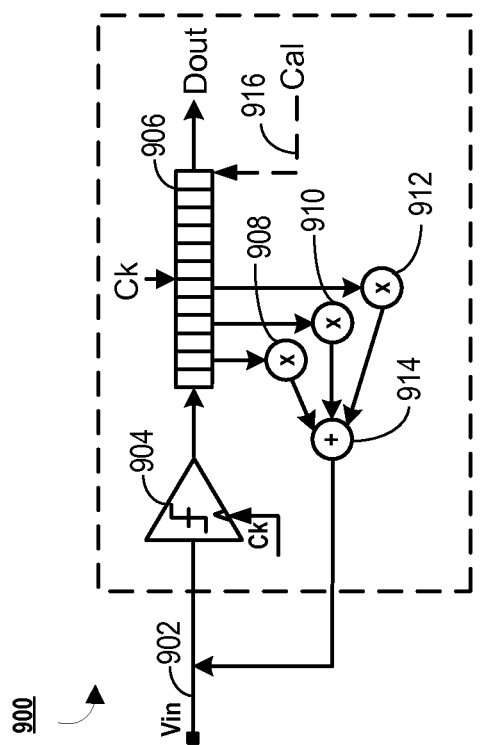
FIG. 9 illustrates a decision equalizer circuit according to another embodiment.

FIG. 9 provides a further example 900, depicted as a traditional DFE having three taps. In this embodiment, an input signal 902 is processed by a comparator 904 (or other sampler) to produce a stream of digital symbols, fed to a linear shift register 906. In the example illustrated, three different "taps" are illustrated, representing latencies of 2, 4 and 6 unit intervals, though of course any number of taps each corresponding to any latency may be used, and a system that features per-tap adjustable latency selection may also be used. As depicted, each tap also includes a respective multiplier circuit 908, 910 or 912, which weights feedback from the shift register by a calibrated weight, which is then driven back onto the input signal 902 by equalization feedback driver 914. Note that well-known design variants exist, including driving equalization feedback into a pre-amplifier stage of the receiver (that is, on-chip as opposed to on an external signal path), and also to adjust the way that sampling is conducted by the comparator 904. In the manner previously described, each tap can be isolated in turn using a corresponding repeating bit sequence, e.g., "0000000010x," "0000001000x" and "0000100000x", with the selected sequence repeated while weights for the isolated tap are swept through a range of values—the bit value "x" in these sequences represents a wildcard for a predetermined pattern, i.e., the bit error rate for the received symbol corresponding to "x" is analyzed and adjusted such that type 1 and type 2 error associated with this value is each 50% likely. If desired, in a system where tap latency is selectable, a thresholding process can also be used, where the tap weight is set to zero (or a different tap weight is selected) unless the bit error rate corresponding to the specific latency is statistically relevant. Note that if desired, comparator 904 can operate with a partial-response equalizer, e.g., having multiple comparators to conditionally sample data values using different thresholds, to effectively compensate for immediately-prior symbols where a traditional DFE design might not be fast enough to provide feedback prior to sampling.

In one alternative embodiment, a digital control signal can instead be used to digitally force the shift register values to a particular state during calibration without actually having to receive these values at the input 902. This digital control signal is illustrated by the phantom line 916 (an option signal). Alternatively, the outputs of multipliers 908, 910, 912 or the feedback driver 914 could be digitally controlled to force their values to a particular state during calibration.

In additional alternative embodiments, the calibration process can be applied to equalizers having additional parallel structures to implement equalization using three or more taps. Furthermore, the calibration process can be applied to equalizers accommodating different combinations of data rates (e.g., more or fewer phases) and number of taps. Furthermore, while some of the embodiments presented above are discussed in the context of a conductive path embodiment, it is also possible to apply the techniques presented above to other systems, including wireless systems, systems having mixed wired and wireless components, optical and other systems.

Upon reading this disclosure, those of ordinary skill in the art will appreciate still alternative structural and functional designs for calibrating a decision feedback equalizer, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A receiver circuit, comprising:
   a first sampling circuit configured to sample during a first calibration period, a first repeating bit position within a first signal pattern based on a first equalization parameter, the first repeating bit position having varying values over multiple transmission periods in the first signal pattern according to a known data pattern, the first signal pattern having a second repeating bit position of fixed latency relative to the first repeating bit position, the second repeating bit position in the first signal pattern having a first fixed logic value; and an error comparator circuit configured to vary the first equalization parameter during the first calibration period while the first sampling circuit samples the first repeating bit position, to compare first resultant digital samples of the first repeating bit position with the known data pattern, and to set the first equalization parameter of the first sampling circuit in response to the comparing.

2. The receiver circuit of claim 1, wherein the receiver circuit further comprises:

a second sampling circuit configured to sample the second repeating bit position; and wherein the error comparator circuit is configured to selectively constrain an output of the second sampling circuit to either a first or second fixed sampler output value.

3. The receiver circuit of claim 2, wherein the error comparator circuit is configured to set a reference voltage of the second sampling circuit to either a first reference level that is below a minimum signal level in the first signal pattern or to a second reference level that is above a maximum signal level in the first signal pattern.

4. The receiver circuit of claim 2, wherein the first sampling circuit comprises:

a first comparator configured to sample the first repeating bit position when the output of the second sampling circuit is constrained to output the first fixed sampler output value; and a second comparator configured to sample the first repeating bit position when the output of the second sampling circuit is constrained to output the second fixed sampler output value.

5. The receiver circuit of claim 4, wherein the first sampling circuit further comprises:

a multiplexer configured to select an output of the first comparator when the output of the second sampling circuit is constrained to output the first fixed sampler output value and to select an output of the second comparator when the output of the second sampling circuit is constrained to output the second fixed sampler output value.

6. The receiver circuit of claim 1, wherein the first sampling circuit is further configured to sample during a second calibration period, the first repeating bit position within a second signal pattern based on a second equalization parameter, the first repeating bit position having varying values over multiple transmission periods in the second signal pattern according to the known data pattern, the second signal pattern having the second repeating bit position of fixed latency relative to the first repeating bit position, the second repeating bit position in the second signal pattern having a second fixed logic value; and wherein the error comparator is further configured to vary the second equalization parameter during the second calibration period while the first sampling circuit samples the first repeating bit position, to compare second resultant digital samples of the first repeating bit position with the known data pattern, and to set the second equalization parameter of the first sampling circuit in response to the comparing.

7. The receiver circuit of claim 6, further comprising:

a second sampling circuit configured to sample during a third calibration period, the second repeating bit position within a third signal pattern based on a third equalization parameter, the second repeating bit position having varying values over multiple transmission periods in the third signal pattern according to the known data pattern, the third signal pattern having the first repeating bit position of fixed latency relative to the second repeating bit position, the first repeating bit position in the third signal pattern having the first fixed logic value; and wherein the error comparator is further configured to vary the third equalization parameter during the third calibration period while the second sampling circuit samples the second repeating bit position, to compare third resultant digital samples of the second repeating bit position with the known data pattern, and to set the third equalization parameter of the second sampling circuit in response to the comparing.

8. The receiver circuit of claim 7, wherein the second sampling circuit is further configured to sample during a fourth calibration period, the second repeating bit position within a fourth signal pattern based on a fourth equalization parameter, the second repeating bit position having varying values over multiple transmission periods in the fourth signal pattern according to the known data pattern, the fourth signal pattern having the first repeating bit position of fixed latency relative to the second repeating bit position, the first repeating bit position in the fourth signal pattern having the second fixed logic value; and wherein the error comparator is further configured to vary the fourth equalization parameter during the fourth calibration period while the second sampling circuit samples the second repeating bit position, to compare fourth resultant digital samples of the second repeating bit position with the known data pattern, and to set the fourth equalization parameter of the second sampling circuit in response to the comparing.

9. The receiver circuit of claim 1, wherein the receiver circuit is embodied in a memory controller.

10. A method for calibrating a decision feedback equalizer, the method comprising:

during a first calibration period, sampling by a first sampling circuit while varying a first equalization parameter of the decision feedback equalizer, a first repeating bit position within a first signal pattern, the first repeating bit position having varying values over multiple transmission periods of the first signal pattern according to a known data pattern, the first signal pattern having a second repeating bit position of fixed latency relative to the first repeating bit position, the second repeating bit position in the first signal pattern having a first fixed logic value;

comparing first resultant digital samples of the first repeating bit position with the known data pattern; and setting the first equalization parameter of the first sampling circuit in response to the comparing.

11. The method of claim 10, further comprising:

sampling, by a second sampling circuit, the second repeating bit position; and selectively constraining an output of the second sampling circuit to either a first or second fixed sampler output value.

12. The method of claim 11, wherein constraining the output of the second sampling circuit comprises:
setting a reference voltage of the second sampling circuit to either a first reference level that is below a minimum signal level in the first signal pattern or to a second reference level that is above a maximum signal level in the first signal pattern.

13. The method of claim 11, wherein sampling the first repeating bit position comprises:
sampling, by a first comparator, the first repeating bit position when the output of the second sampling circuit is constrained to output the first fixed sampler output value; and
sampling, by a second comparator, the first repeating bit position when the output of the second sampling circuit is constrained to output the second fixed sampler output value.

14. The method of claim 13, further comprising:
selecting, by a multiplexer, the output of the first comparator when the output of the second sampling circuit is constrained to output the first fixed sampler output value; and
selecting, by the multiplexer, the output of the second comparator when the output of the second sampling circuit is constrained to output the second fixed sampler output value.

15. The method of claim 10, further comprising:
during a second calibration period, sampling by the first sampling circuit, the first repeating bit position within a second signal pattern while varying a second equalization parameter of the decision feedback equalizer, the first repeating bit position having varying values over multiple transmission periods in the second signal pattern according to the known data pattern, the second signal pattern having the first repeating bit position of fixed latency relative to the second repeating bit position, the second repeating bit position in the second signal pattern having a second fixed logic value;
comparing second resultant digital samples of the first repeating bit position with the known data pattern; and
setting the second equalization parameter of the first sampling circuit in response to the comparing.

16. The method of claim 15, further comprising:
during a third calibration period, sampling by a second sampling circuit, the second repeating bit position within a third signal pattern while varying a third equalization parameter of the decision feedback equalizer, the second repeating bit position varying over multiple transmission periods of the third signal pattern according to the known data pattern, the third signal pattern having the first repeating bit position of fixed latency relative to the second repeating bit position, the first repeating bit position in the third signal pattern having the first fixed logic value;
comparing third resultant digital samples of the second repeating bit position with the known data pattern; and
setting the third equalization parameter of the second sampling circuit in response to the comparing.

17. The method of claim 16, further comprising:
during a fourth calibration period, sampling by the second sampling circuit, the second repeating bit position within a fourth signal pattern while varying a fourth equalization parameter of the decision feedback equalizer, the second repeating bit position having varying values over multiple transmission periods of the fourth signal pattern according to the known data pattern, the fourth signal pattern having the first repeating bit position of fixed latency relative to the second repeating bit position, the first repeating bit position having the second fixed logic value;
comparing fourth resultant digital samples of the second repeating bit position with the known data pattern; and
setting the fourth equalization parameter of the second sampling circuit in response to the comparing.

18. A method for transmitting a signal pattern for calibrating a decision feedback equalizer, the method comprising:
transmitting the signal pattern in a manner such that a first repeating bit position within the signal pattern varies over multiple transmission periods according to a known data pattern; and
transmitting the signal pattern in a manner such that at least one second repeating bit position within the signal pattern of fixed latency relative to the first repeating bit position represents a fixed logic value over the multiple transmission periods,
wherein transmitting the signal pattern comprises transmitting the signal pattern through multiple iterations of repetition and varying an equalization coefficient of the decision feedback equalizer associated with the fixed latency through multiple values.

19. The method of claim 18,
wherein the decision feedback equalizer comprises first and second sampling circuits to produce respective output bit streams according to respective sampling phases of a multi-data rate signal,
wherein the second repeating bit position corresponds to a given phase of the multi-data rate signal, and
wherein the fixed latency comprises a latency between the phase corresponding to the second repeating bit position and a phase of the multi-data rate signal immediately preceding the given phase.

* * * * *